(12) United States Patent
Leopold

(10) Patent No.: US 7,399,008 B2
(45) Date of Patent: Jul. 15, 2008

(54) SAFETY LOCKING DEVICE FOR A CONTAINER IN A VEHICLE

(75) Inventor: Gunter Leopold, Baiersbronn (DE)

(73) Assignee: fischerwerke GmbH. & Co. KG, Waldachtal (DE)

( * ) Notice: Subject to any disclaimer, the term of this patent is extended or adjusted under 35 U.S.C. 154(b) by 0 days.

(21) Appl. No.: 10/568,249

(22) PCT Filed: Aug. 25, 2004

(86) PCT No.: PCT/EP2004/009464

§ 371 (c)(1),
(2), (4) Date: Aug. 3, 2006

(87) PCT Pub. No.: WO2005/028792

PCT Pub. Date: Mar. 31, 2005

(65) Prior Publication Data

US 2006/0261598 A1      Nov. 23, 2006

(30) Foreign Application Priority Data

Sep. 4, 2003      (DE) ............................... 103 40 673

(51) Int. Cl.
*E05B 65/10* (2006.01)
*E05C 3/14* (2006.01)
(52) U.S. Cl. .................. 292/92; 292/238; 292/DIG. 65
(58) Field of Classification Search ................... 292/92, 292/219, 229, 230, DIG. 65, 238, 202, 210, 292/304; 296/37.9, 37.11; 312/333
See application file for complete search history.

(56) References Cited

U.S. PATENT DOCUMENTS

| 5,052,728 | A | * | 10/1991 | Fukumoto ................... 292/106 |
| 5,306,081 | A | * | 4/1994 | Fukumoto .............. 312/334.44 |
| 5,386,636 | A | * | 2/1995 | Asano ...................... 312/319.2 |
| 5,388,901 | A | * | 2/1995 | Asano ........................ 312/222 |
| 5,393,137 | A | * | 2/1995 | Bivens et al. ................ 312/332 |
| 6,213,533 | B1 | * | 4/2001 | Widulle et al. ........... 296/37.12 |

FOREIGN PATENT DOCUMENTS

| DE | 41 30 847 A | 3/1993 |
| DE | 44 27 768 C1 | 11/1995 |
| DE | 100 09 291 A1 | 9/2001 |
| DE | 201 16 159 U1 | 3/2002 |
| DE | 101 21 681 A | 11/2002 |
| DE | 102 24 862 A1 | 12/2003 |
| EP | 0 610 882 A2 | 2/1994 |
| WO | 03/104591 A | 12/2003 |

OTHER PUBLICATIONS

International Search Report for corresponding PCT/EP2004/009464, mailed, Nov. 26, 2004.
German Search Report for corresponding Application No. 103 40 673.5 mailed Apr. 14, 2004.

* cited by examiner

*Primary Examiner*—Patricia Engle
*Assistant Examiner*—Alyson M Merlino
(74) *Attorney, Agent, or Firm*—Renner, Otto, Boisselle & Sklar, LLP

(57) ABSTRACT

A safety locking mechanism includes an engaging device, which holds a mass in a deflected position, and a restoring device effective by applying an overpressure to a receptacle and which directs the mass into a basic position.

4 Claims, 3 Drawing Sheets

SAFETY LOCKING DEVICE FOR A CONTAINER IN A VEHICLE

The present application claims priority under 35 USC §119 to German patent application No. 103 40 673.5, filed Sep. 4, 2003, the entire disclosure of which is incorporated herein by reference.

TECHNICAL FIELD OF THE INVENTION

The invention concerns a safety locking mechanism for a receptacle in a vehicle.

The safety locking mechanism is provided in particular for a motor vehicle. The receptacle can be, for example, a storage compartment with an insert extendable in the manner of a drawer. A cover of a storage or glove compartment or, instead of a receptacle, for example a slider of a drink holder, may also be locked in the closed position by the safety locking mechanism according to the invention in the event of an accident.

DESCRIPTION OF RELATED ART

Safety locking mechanisms are known per se. Their function is to prevent a receptacle from opening, especially to prevent a slider from extending outwards in the event of an accident, especially in the event of a front-end or rear-end collision. Sliders, covers or similar parts are intended to be prevented from projecting into the passenger space and consequently posing a risk of injury to the occupants. In addition, articles stored in the receptacle are intended to be prevented from entering the passenger compartment of the vehicle as a result of opening of a receptacle, and from flying around and posing a risk of injury.

Such a safety locking mechanism is disclosed in EP 610 882 A2. The said printed specification discloses a receptacle with an insert extendable in the manner of drawer, which is pushed out into an opened position by means of a spring element. What is commonly called a push-push locking mechanism holds the insert against the force of the spring element in an inserted, closed position. The locking mechanism comprises a hook-form, spring-loaded locking element. To develop the locking mechanism to a safety locking mechanism, the said printed specification proposes structuring the hook-form locking element by shaping or by means of an eccentrically arranged weight so that an acceleration or deceleration acting on the locking element during an accident loads the locking element against a spring force of the spring element. The locking element is thereby prevented from becoming disengaged from the insert as a result of an acceleration or deceleration taking effect during an accident.

Another safety locking mechanism is disclosed in U.S. Pat. No. 5,052,728. Here, a slidably guided mass prevents a likewise hook-form locking element of a push-push locking mechanism from pivoting and hence from becoming disengaged from a compartment extendable in the manner of a drawer, the mass moving against the force of a spring element in the event of an accident.

Thus, the feature common to both known safety locking mechanisms is that it is the push-push locking mechanism itself that is loaded. But such safety locking mechanisms do not lock reliably, if a series of accelerations and decelerations of different intensities occurs, for example in consequence of an accident involving several vehicles.

SUMMARY OF THE INVENTION

The invention is therefore based on the problem of proposing a safety locking mechanism of the kind explained above, the reliability of which against opening of a receptacle as a result of an accident is increased.

The safety locking mechanism according to the invention has a mass, which is movably guided by a guide means from a basic position into a deflected position. The guide means can be a rectilinear or non-rectilinear sliding guide means. A pivoted mounting, which guides the mass movably in a circular arc, is also possible. Furthermore, the safety locking mechanism according to the invention comprises an arrangement that holds the mass in a basic position when no acceleration or deceleration is acting on the mass in the direction of its deflection. This arrangement can comprise, for example, a spring element, which holds the mass against a stop when no acceleration/deceleration is acting the mass. An acceleration/deceleration can move the mass in a direction against the force of the spring element, that is, can deflect it. It is also possible to use a spring element to hold the mass in a basic position, in which the spring element is relaxed. A deflection of the mass by an acceleration/deceleration is possible in two opposite directions, possibly in one or more transverse directions as well.

Furthermore, the invention proposes an engaging device, which holds the mass in the deflected position when an acceleration or deceleration acting on the mass has moved it into the deflected position. In this position, the mass keeps the receptacle closed. At the same time, the mass can keep the receptacle closed directly or indirectly, by way of a locking element for example. The engaging device keeps the receptacle closed even when the acceleration/deceleration is no longer effective. The receptacle is thus not opened by further inertial forces, as occur during an accident, acting on the receptacle.

Following an accident it may be important, however, that the receptacle is opened, for example, to remove a mobile telephone located in the receptacle in order to notify the emergency services. The invention therefore additionally provides a restoring device effective through the application of an overpressure, which steers the mass back into its basic position and hence releases the receptacle for opening. The important factor here is that the application of an overpressure to the receptacle cannot be effected by acceleration forces such as those occurring during an accident, but only by the user. This can be achieved, for example, in that for application of an overpressure to the receptacle, a spring, the receptacle or the housing have to be resiliently and/or plastically deformed, the corresponding components being designed so that the forces are appreciably greater than the acceleration forces. Since the acceleration forces can be very high, however, for example resulting from articles in the receptacle, and hence inevitably the forces for applying an overpressure must be even greater, a preferred embodiment of the invention provides a damping element to act against the application of an overpressure. Whereas in the case of sharp, short accelerations, as occur during accidents, a damping element provides high opposed forces, in the case of a slow movement it requires only slight force from the operator. This is facilitated by a progressively increasing characteristic of the damping element, that is, with increasing speed a superproportionately increasing damping force is generated.

One construction of the invention provides for the mass to be deflectable in two opposing directions, to be held in each of the two deflected positions by the engaging device and to hold the receptacle closed in each deflected position. The two directions are preferably selected so that an acceleration or deceleration in the longitudinal direction of the vehicle deflects the mass. The safety locking mechanism is accordingly effective in a front-end or a rear-end collision. If the safety locking mechanism is to be effective for a side-on collision as well, a longitudinal and transverse guidance, or a guidance of the mass with degrees of freedom in the longitudinal and transverse direction, or a second safety locking mechanism for the transverse direction can be provided. The mass can be held in any deflected position by an engaging device, or an engaging device that holds the mass in any deflected position is provided. Similarly, such an embodiment of the invention comprises a restoring device, which returns the mass from any deflected position into the basic position again when an overpressure is applied to the receptacle.

When constructing the invention, allowances should be made for what happens when the receptacle is open and high acceleration forces caused by an accident act on the receptacle, so that, for example, it moves against the force of a scroll spring towards the closed position. In this case, the mass has already reached its deflected position before the closed position of the receptacle is reached. In an embodiment of the invention, in which, for example, a holding claw of the mass engages in an undercut of the receptacle (or vice versa), it may consequently happen that a surface lying in front of the undercut impacts against the holding claw. The effect of this would be that the closing movement would be stopped and the receptacle, being unlocked, would open again. This involves the above-mentioned dangers, however. In a preferred construction of the invention, the safety locking mechanism comprises a second restoring device. This returns the mass to the basic position by moving the receptacle from the open into the closed position. Correspondingly, the closed position can be reached and the receptacle is locked, as it would be in a closing process carried out by the user, for example, by means of a push-push locking mechanism. Alternatively, it would be possible for the undercut for locking of the receptacle by means of the mass to be in the form of a resilient flap or the like, i.e. for the receptacle to remain closable and to lock even with the mass deflected.

BRIEF DESCRIPTION OF THE DRAWINGS

The invention is explained in detail below with reference to an exemplary embodiment illustrated in the drawings, in which.

DETAILED DESCRIPTION OF THE EMBODIMENTS

Figure 1:
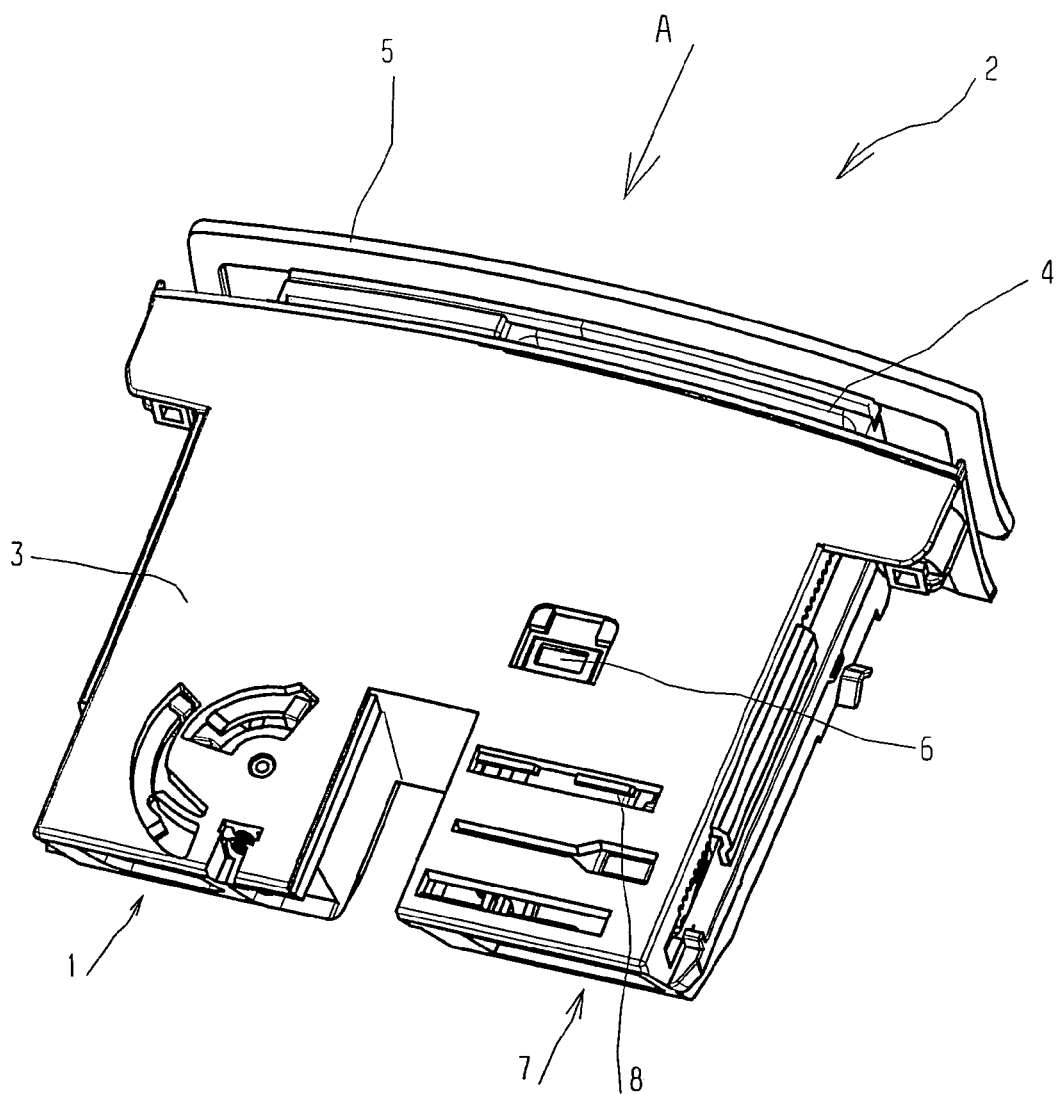
FIG. 1 is a perspective view of an ashtray with a safety locking mechanism according to the invention.

The safety locking mechanism 1 according to the invention illustrated in FIGS. 1 to 5 is part of an ashtray 2 for a motor vehicle. FIG. 1 shows the entire ashtray 2. It comprises in particular a housing 3, from which a drawer, as the receptacle 4, can be slid in and out using a front cover 5 for opening and closing. The receptacle 4 can have, for example, a lighter and a removable dish for ash. The ashtray 2, together with its housing 3, is built into a receiving slot of a motor vehicle so that only the front cover 5 and, in the opened state, the receptacle 4, are accessible to the user. Both closing and opening of the receptacle 4 is effected by pressing the front cover 5 as indicated by the arrow A. To permit this, the ashtray 2 has a scroll spring 6 and a push-push locking mechanism 7. The scroll spring is secured at one end to the housing 3 and at the other end to the receptacle 4, and exerts a force opposing closure. The push-push locking mechanism 7 ensures that the receptacle 4 is locked as it is closed and is unlocked when light pressure is applied to the front cover 5 for opening. It consists of a slider 8 displaceably mounted in the housing 3 as well as a pin 9 arranged on the receptacle (see FIGS. 2 to 5).

Figure 2:
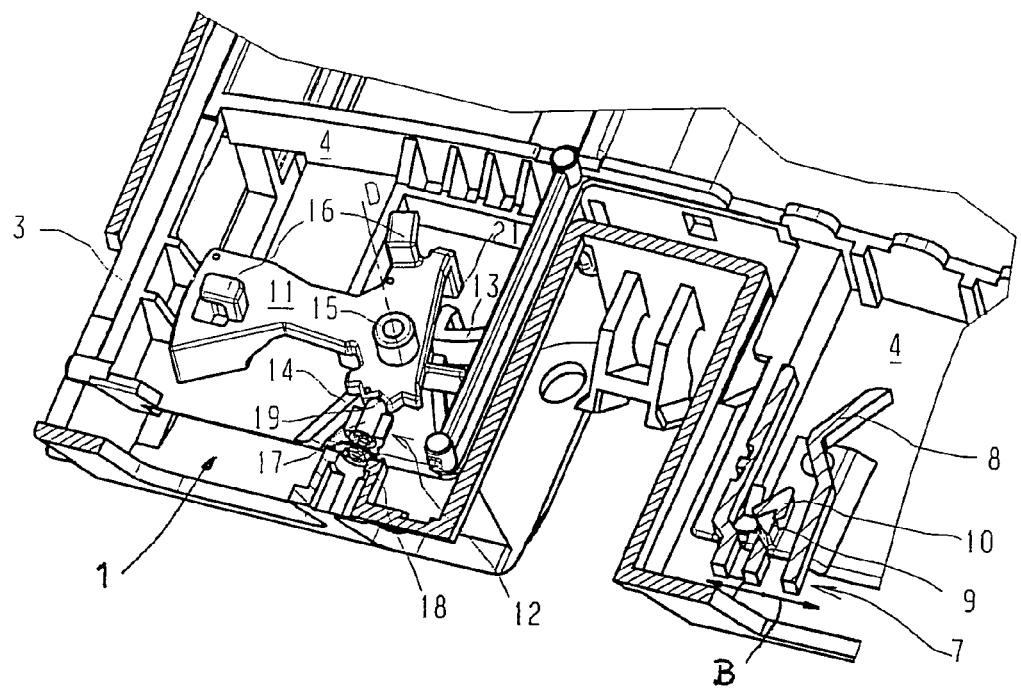
FIGS. 2 and 3 are perspective views of the closed ashtray with the safety locking mechanism in the basic position.
Figure 3:
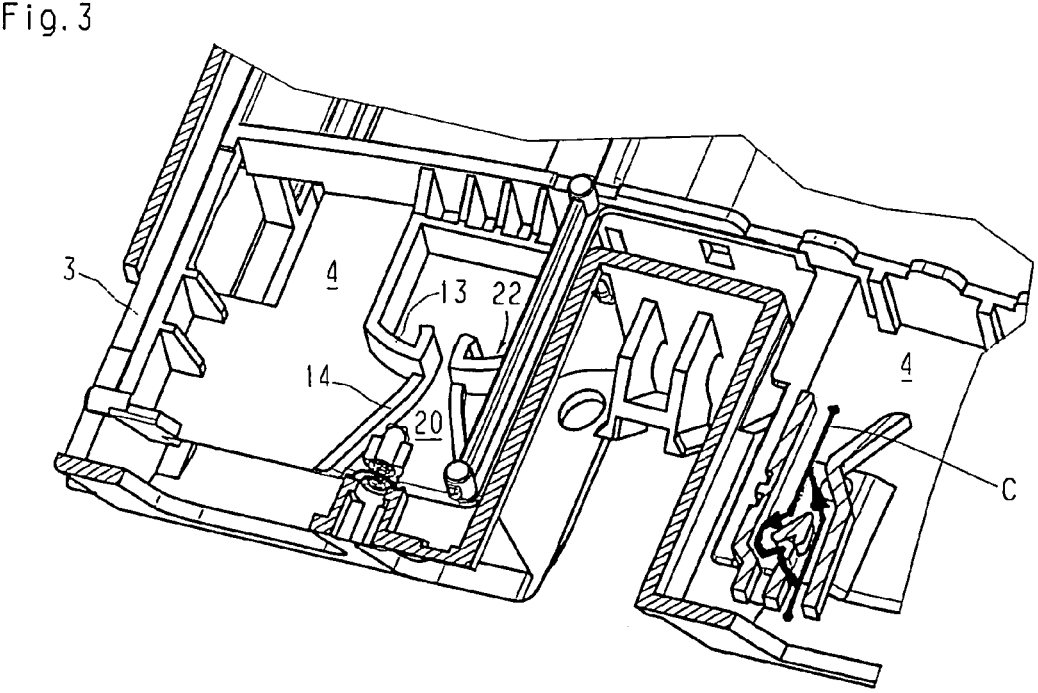

FIG. 2 shows, to an enlarged scale, the region of the safety locking mechanism 1 as well as the push-push locking mechanism 7, the housing 3 being cut open at the top and only the rear part of the receptacle 4 not accessible to the user being shown. The slider 8, which can be displaced as indicated by the double-ended arrow B, is also shown cut away. As the receptacle 4 is in the closed position, the pin 9 of the push-push locking mechanism 7 is resting against what is called the cardioid 10 of the slider 8. FIG. 3 shows by means of the contour C the path taken by the pin 9 relative to the slider 8 during an opening and closing process of the receptacle 4. The safety locking mechanism 1 consists of the mass 11, the engaging device 12 and the first and second restoring devices 13 and 14. These become apparent from FIG. 3, in which the mass 11 is omitted for reasons of clarity. The mass 11 is mounted in the housing 3 so as to rotate about the axis D. The bearing pin 15 is used for this, plus, for guidance, the two bearing claws 16. By virtue of the engaging device 12, which is formed by the stop bolt 17, the stop spring 18 and the locking notches 19 on the mass 11, during normal driving the mass 11 always stays in the basic position illustrated here. Because of the recess 20 (FIG. 3) in the contours of the receptacle 4, the receptacle 4 can be opened and closed without contacting the mass 11 in the region of the holding claw 21.

Figure 4:
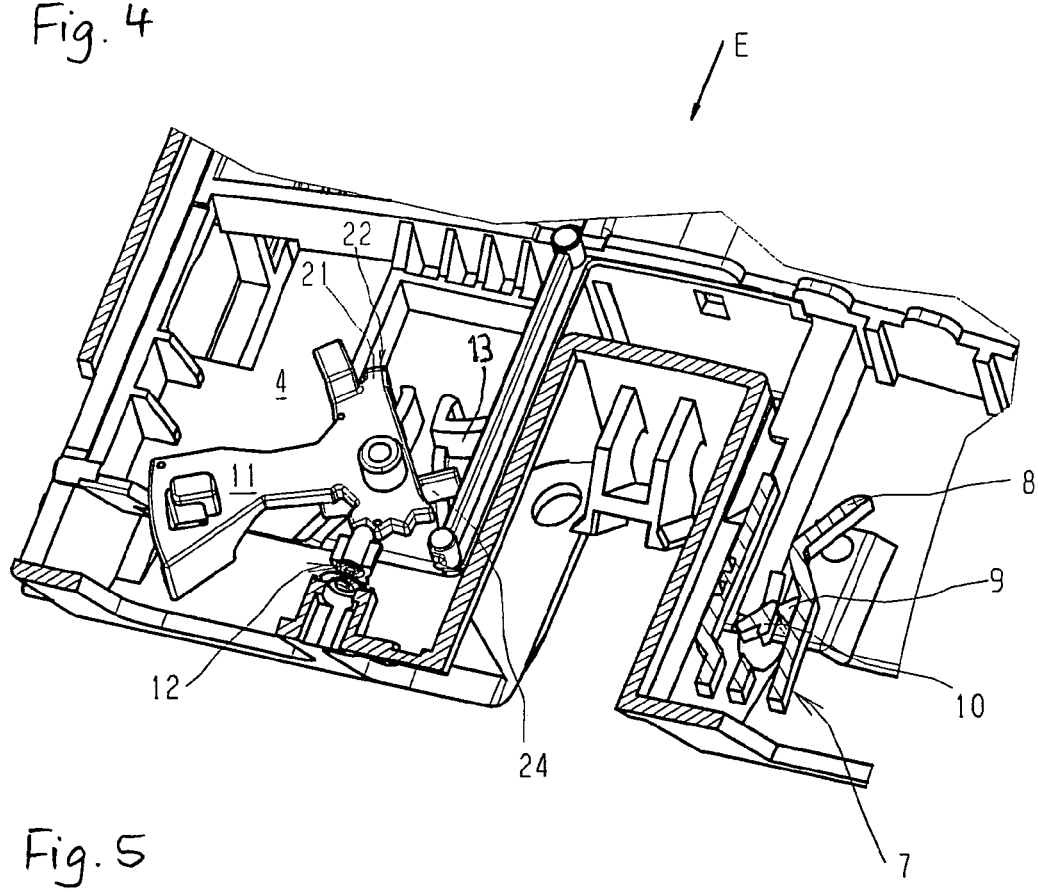
FIG. 4 is a perspective sectional view of the ashtray following an accident, with the safety locking mechanism in the deflected position.

FIG. 4 shows same region of the ashtray 2 after a sharp acceleration process in the direction of arrow E, for example, in consequence of an accident. Since the centre of gravity of the mass 11 is arranged eccentrically with respect to the axis D, when sudden acceleration processes occur such a strong moment acts on the mass 11 that the holding forces of the engaging device 12 are overcome and the mass 11 is rotated into the deflected position shown here. The holding claw 21 consequently moves into the region of the undercut 22 (see also FIG. 3) of the receptacle 4 and thereby prevents this from being opened by the scroll spring 6 (see FIG. 1). In this way, the receptacle 4 remains at least largely closed, which appreciably reduces the risk of injury in the passenger space compared to an opened ashtray. The push-push locking mechanism 7 is unable to afford this protection. The sudden acceleration process moves the receptacle slightly in the direction of the arrow E, which corresponds to the movement when light pressure is applied to the front cover 5 (see FIG. 1) to open the receptacle 4. As a result, the pin 9 is released from the cardioid 10, displaces the slider 8 and as a consequence no longer has any purchase there.

Figure 5:
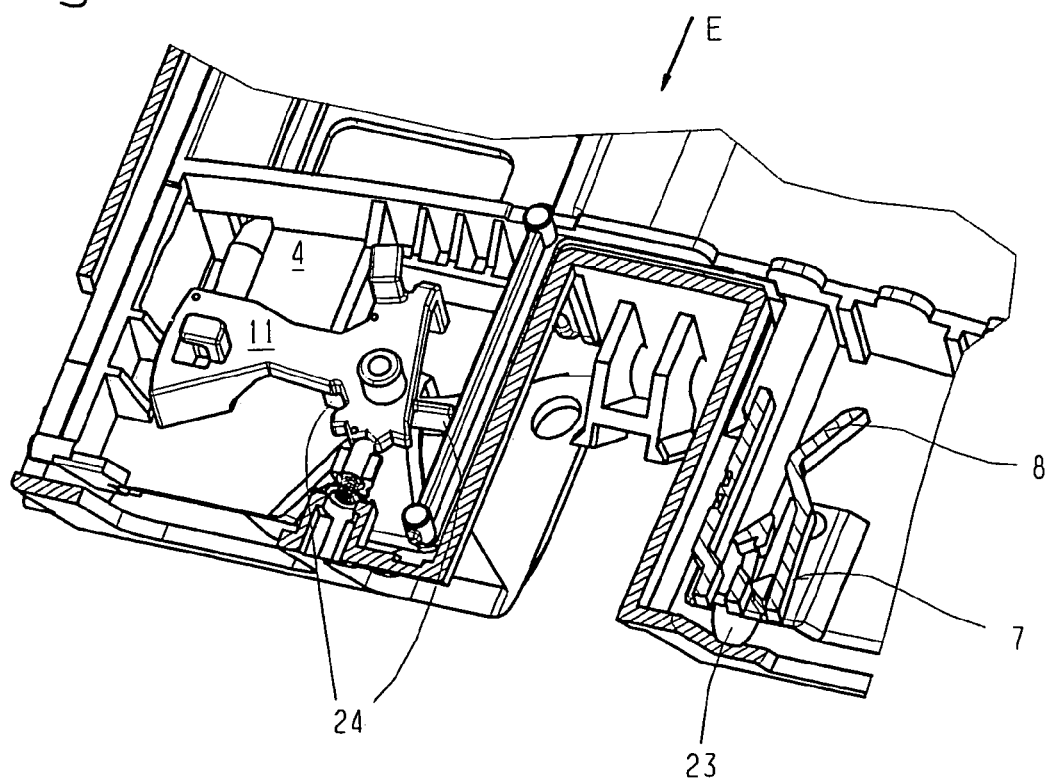
FIG. 5 is a perspective sectional view of the ashtray following an accident, with the safety locking mechanism during the restoring process.

To release the safety locking mechanism 1, the user applies a little overpressure to the receptacle 4 at the front cover 5 (see FIG. 1) in the direction of the arrow E, as in FIG. 5. This application of an overpressure is effected against the action of the damping element 23. This produces a force that increases superproportionately as the speed increases, that is, when movements are short and rapid—such as those occurring during an accident—the damping element becomes very "hard" and thus prevents overpressure from being applied, whereas during slower movement—as when a user slowly applies an overpressure—it remains "soft". The effect of applying an overpressure to the receptacle 4 is that the mass 11 is caused to reach the illustrated basic position by the first restoring device 13. This is achieved owing to the fact that the mass 11 has a restoring rib 24, which comes into contact with the contour of the first restoring device 13 when an overpressure is applied to the receptacle 4, and thereby produces a restoring moment. The slider 8 of the push-push locking mechanism 7 is not moved during this process, so that the receptacle can continue to be opened.

As becomes clear from FIGS. 4 and 5, the safety locking mechanism 1 fulfils its function both under sudden accelerations in the direction of arrow E and in the opposite direction, that is, for example, both in the event of a front-end and in the event of a rear-end collision. When acceleration opposite to the direction of the arrow E occurs, locking is merely an additional safeguard, as in this case the push-push locking mechanism 7 itself effects locking of the receptacle 4. Because the structural parts are small, however, this locking often does not provide adequate stability, so that an additional securing is sensible.

If the ashtray is open at the time of an accident, and a sudden acceleration in the direction of arrow E occurs, the receptacle is closed as when operated manually, and at the same time is locked by the push-push locking mechanism 7. Since the mass 11 is deflected by the acceleration, it is important that before the closed position is reached a surface arranged in front of the undercut 22 (see FIG. 3) does not collide with the holding claw 21. This is safeguarded by the second restoring device 14 (see FIG. 3), the contour of which ensures that the holding claw 21 is pressed in the direction of the recess 20 and hence the mass returns to its basic position again.

The invention claimed is:

1. A safety locking mechanism in combination with a receptacle or compartment with a movable member in a vehicle, the receptacle or compartment with a movable member being movable back and forth between an opened and a closed position, the safety locking mechanism comprising:

a mass, which is movably guided by a guide means from a basic position into a deflected positions, wherein the mass holds the receptacle or compartment with a moveable member closed when the mass is moved into the deflected positions, and a device which holds the mass in the basic position when no acceleration or deceleration acts in the deflection direction on the mass, wherein the safety locking mechanism further comprises
an engaging device, which holds the mass in the deflected positions and
a restoring device, effective in response to an overpressure applied to the receptacle or compartment with a movable member, to direct the mass as held by the engaging device in the deflected positions into the basic position, and wherein the mass is deflectable in two opposing directions, is held in each deflected position by the engaging device, holds the receptacle or compartment with a movable member in each deflected position and is directed by the restoring device into the basic position when an overpressure is applied to the receptacle or compartment with a moveable member.

2. A safety locking mechanism according to claim 1, wherein a damping element acts against the application of an overpressure to the receptacle or compartment with a movable member.

3. A safety locking mechanism according to claim 2, wherein the characteristic of the damping element is such that as speed increases a superproportionate damping force occurs.

4. A safety locking mechanism according to claim 1, wherein the safety locking mechanism comprises a second restoring device effective by movement of the receptacle or compartment with a movable member from the open into the closed position.

* * * * *

UNITED STATES PATENT AND TRADEMARK OFFICE
CERTIFICATE OF CORRECTION

PATENT NO.        : 7,399,008 B2                                              Page 1 of 1
APPLICATION NO.   : 10/568249
DATED             : July 15, 2008
INVENTOR(S)       : Gunter Leopold It is certified that error appears in the above-identified patent and that said Letters Patent is hereby corrected as shown below:

On the Title page, item [73] Assignee: replace "fischerwerke Artur Fischer GmbH & Co. KG" with --fischer automotive systems GmbH--.

Signed and Sealed this

Thirtieth Day of September, 2008

JON W. DUDAS
*Director of the United States Patent and Trademark Office*